United States Patent [19]

Ogata

[11] Patent Number: 4,596,121
[45] Date of Patent: Jun. 24, 1986

[54] CONTROL APPARATUS FOR SELECTIVELY SUPPLYING ELECTRICITY

[75] Inventor: Hikari Ogata, Toyota, Japan
[73] Assignee: Toyota Jidosha Kabushiki Kaisha, Aichi, Japan
[21] Appl. No.: 742,542
[22] Filed: Jun. 7, 1985
[30] Foreign Application Priority Data

Jun. 12, 1984 [JP] Japan .................. 59-120575

[51] Int. Cl.$^4$ .................. B60H 1/32; H01H 7/03
[52] U.S. Cl. .................. 62/133; 62/243; 200/34
[58] Field of Search .......... 62/133, 230, 243, 158, 62/323.1, 323.4; 200/34, 83 T

[56] References Cited

U.S. PATENT DOCUMENTS

| 2,746,261 | 5/1956 | Gibson | 62/208 |
| 3,186,184 | 6/1965 | Pruitt | 62/243 |
| 3,462,964 | 8/1969 | Haroldson | 62/133 |
| 3,731,021 | 5/1973 | Barnard | 200/34 |
| 4,155,225 | 5/1979 | Upchurch, Jr. | 62/133 |
| 4,269,033 | 5/1981 | Birch | 62/133 |
| 4,355,523 | 10/1982 | Shimada | 62/133 |
| 4,424,682 | 1/1984 | Miska et al. | 62/133 |
| 4,445,341 | 5/1984 | Hayashi | 62/133 |

FOREIGN PATENT DOCUMENTS

| 52-132548 | 4/1976 | Japan . | |
| 0130816 | 8/1982 | Japan | 62/133 |

Primary Examiner—Harry B. Tanner
Attorney, Agent, or Firm—Parkhurst & Oliff

[57] ABSTRACT

The present invention relates to improvements in an apparatus for supplying electricity, which can supply the electricity to the compressor after a predetermined time period has passed from an initiation of the acceleration of the vehicle. The apparatus includes an outer cylinder, an intermediate cylinder and an inner cylinder. The intermediate cylinder is slidably mounted within the outer cylinder, and the inner cylinder is slidably mounted within the intermediate cylinder. The outer cylinder has a pair of terminals thereon. One of the terminals is connected to a relay, and the other is connected to a battery. A rod of the intermediate cylinder projects from the outer cylinder, and the rod is displaced by the movement of an accelerator pedal or a throttle valve. The intermediate cylinder includes a pair of contacts and a check valve thereof, and the pair of contacts are respectively connected to the pair of terminals. The inner cylinder includes an orifice and a connector. Accordingly, when the rod of the intermediate cylinder is displaced, the pair of contacts of the intermediate cylinder contact to the connector of the inner cylinder. As a result, electricity is supplied from the battery to the relay which opens a circuit so that electricity is not supplied to the compressor. When the predetermined time period has passed, the connector of the inner cylinder is separated from the pair of contacts of the intermediate cylinder by a spring. Accordingly, the circuit is closed and electricity is again supplied from the battery to the compressor again.

17 Claims, 6 Drawing Figures

CONTROL APPARATUS FOR SELECTIVELY SUPPLYING ELECTRICITY

BACKGROUND OF THE INVENTION

The present invention relates to a control apparatus for supplying electricity to an air conditioning control device for a vehicle which includes a compressor driven by an engine. More particularly, the present invention relates to improvements on an apparatus for supplying electricity to a relay of the compressor of the air conditioning control device at an initiation of acceleration of the vehicle. As a result, electricity is not supplied to the compressor, and almost all the output from the engine is used to drive the vehicle at full speed.

Automobile air conditioning systems are commonly driven through a mechanical connection to the vehicle engine. However, operation of the air conditioning system when maximum engine output is needed (for example, when accelerating) may add an excessive load to the engine. A control apparatus is necessary to disconnect the connection between the engine and air conditioning system when the engine accelerates.

A control apparatus is disclosed in Japanese Utility Model Application Laid-open No. Showa 52-132548. This Laid-open Application No. Showa 52-132548 discloses a vacuum manipulator as an apparatus for cutting off electricity, which manipulator communicates with an intake manifold of the engine. When the vehicle is accelerating at full speed, a vacuum of the intake manifold becomes weak. As a result, the vacuum manipulator cuts off electricity to a compressor of the air conditioning control device, and almost all the output from the engine is used to drive the vehicle at full speed.

However, the vacuum manipulator cannot be useful as the apparatus for cutting off electricity to the compressor of the air conditioning control device installed on a diesel engine, because the diesel engine has a constant vacuum in an intake manifold thereof.

Further, the Laid-open Application No. Showa 52-132548 discloses delay mechanisms for maintaining the condition that electricity is not supplied to the compressor of the air conditioning control device during a predetermined period after the vacuum manipulator cuts off the electricity. One of the delay mechanisms includes a vacuum reservoir and an orifice, and an another delay mechanism includes a delay relay. The use of a vacuum manipulator and delay mechanisms result in a relatively large, bulky device for interrupting the supply of electricity. However, a compact apparatus which includes both the apparatus for cutting of electricity and delay mechanisms is not disclosed.

An another apparatus for cutting off electricity which is supplied to the compressor of the air conditioning control device is disclosed in U.S. Pat. No. 3,186,184. The '184 patent discloses an air conditioning control apparatus which is directly responsive to the displacement of an accelerator pedal. The air conditioning control apparatus, however, frequently cuts off electricity, according to the displacement of the accelerator pedal. This necessitates a higher durability of this apparatus, and a higher manufacturing cost. Further, when the accelerator pedal is displaced, the air conditioning control apparatus maintains a condition that the electricity is not supplied to a compressor. Accordingly, a passenger cannot obtain cool air during the accelerating condition of the vehicle.

Other air conditioner control devices are disclosed in U.S. Pat. Nos. 2,746,261; 3,462,964; 4,155,255; 4,355,523; 4,424,682; and 4,445,341.

SUMMARY OF THE INVENTION

The present invention was developed in view of the foregoing background and to overcome the foregoing drawbacks. It is accordingly an object of this invention to provide an apparatus for supplying electricity to a relay of a compressor of an air conditioning control device which can be utilized for both a gasoline engine and a diesel engine.

It is an another object of this invention to provide a compact apparatus which includes both means for supplying electricity and delay means.

In order to use the inventive apparatus for both a gasoline engine and a diesel engine, a rod is provided in the apparatus for supplying electricity, which rod is projected from an intermediate cylinder of the apparatus. The rod is operated when an accelerator pedal of a vehicle is operated by a driver, or when a throttle valve of an engine is opened. The intermediate cylinder includes a check valve which is mounted on a bottom portion thereof, and a pair of contacts which are positioned on an inner top surface thereof.

The intermediate cylinder is slidably mounted on an inner cylindrical surface of an outer cylinder, and each of the contacts is respectively electrically connected to a pair of terminals which are mounted on an outer surface of the outer cylinder. The outer cylinder includes an orifice mounted on a bottom portion thereof.

Further, an inner cylinder is slidably mounted on an inner cylindrical surface of the intermediate cylinder, and the inner cylinder includes an air passage and an another contact. The air passage connects a lower chamber defined between an inner bottom surface of the intermediate cylinder and an outer bottom surface of the inner cylinder to an upper chamber defined between the inner top surface of the intermediate cylinder and an outer top surface of the inner cylinder. Another orifice is formed on the air passage of the inner cylinder, and the another contact is mounted on the outer top surface of the inner cylinder.

Furthermore, a bias spring is mounted between an outer bottom surface of the intermediate cylinder and an inner bottom surface of the outer cylinder, and the intermediate cylinder is biased in the direction which separates it from the inner bottom surface of the outer cylinder. Another bias spring is mounted between the inner top surface of the intermediate cylinder and the outer top surface of the inner cylinder, and the inner cylinder is biased in the direction which separates it from the inner top surface of the inner intermediate cylinder.

Accordingly, the apparatus for supplying electricity includes the inner cylinder and the intermediate cylinder within the outer cylinder. As a result, the apparatus is compact. Further, the apparatus is operated by the rod of the intermediate cylinder which rod is responsive to vehicle acceleration. Therefore, this apparatus can be utilized for both the gasoline and diesel engines.

BRIEF DESCRIPTION OF THE DRAWINGS

The above objects, features and advantages of the present invention will become more apparent from the detailed description of the invention which follows, taken in conjunction with the accompanying drawings, wherein like reference numerals denote like elements, and wherein.

DETAILED DESCRIPTION OF THE PREFERRED EMBODIMENTS

The present invention will be described in detail with reference to the accompanying drawings which illustrate different embodiments according to the present invention.

Figure 1:
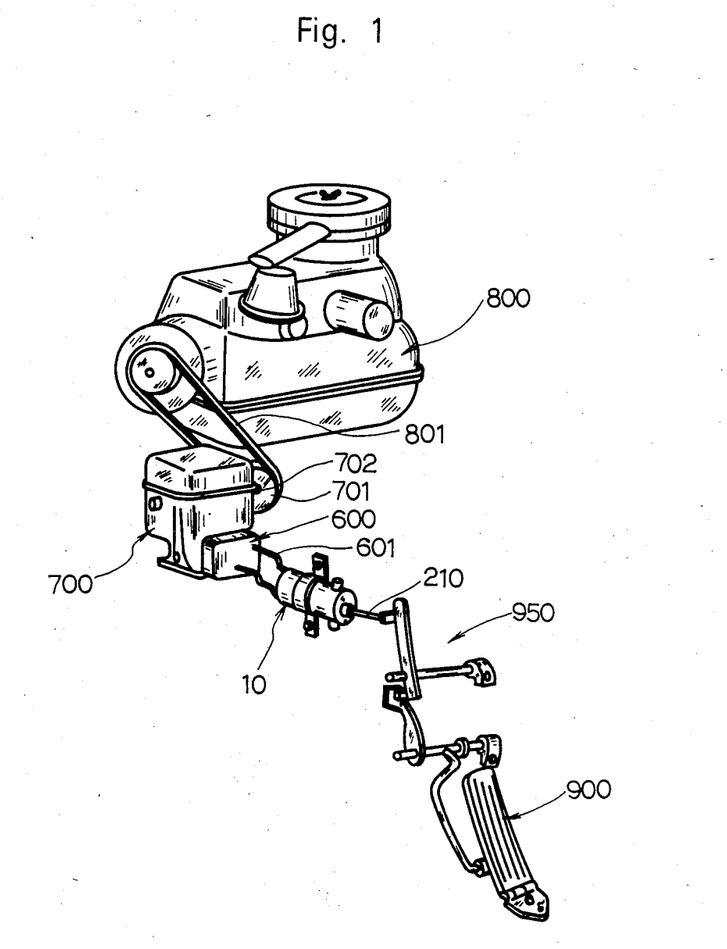
FIG. 1 is a perspective view of an apparatus for supplying electricity according to the present invention installed on a vehicle.
Figure 2:
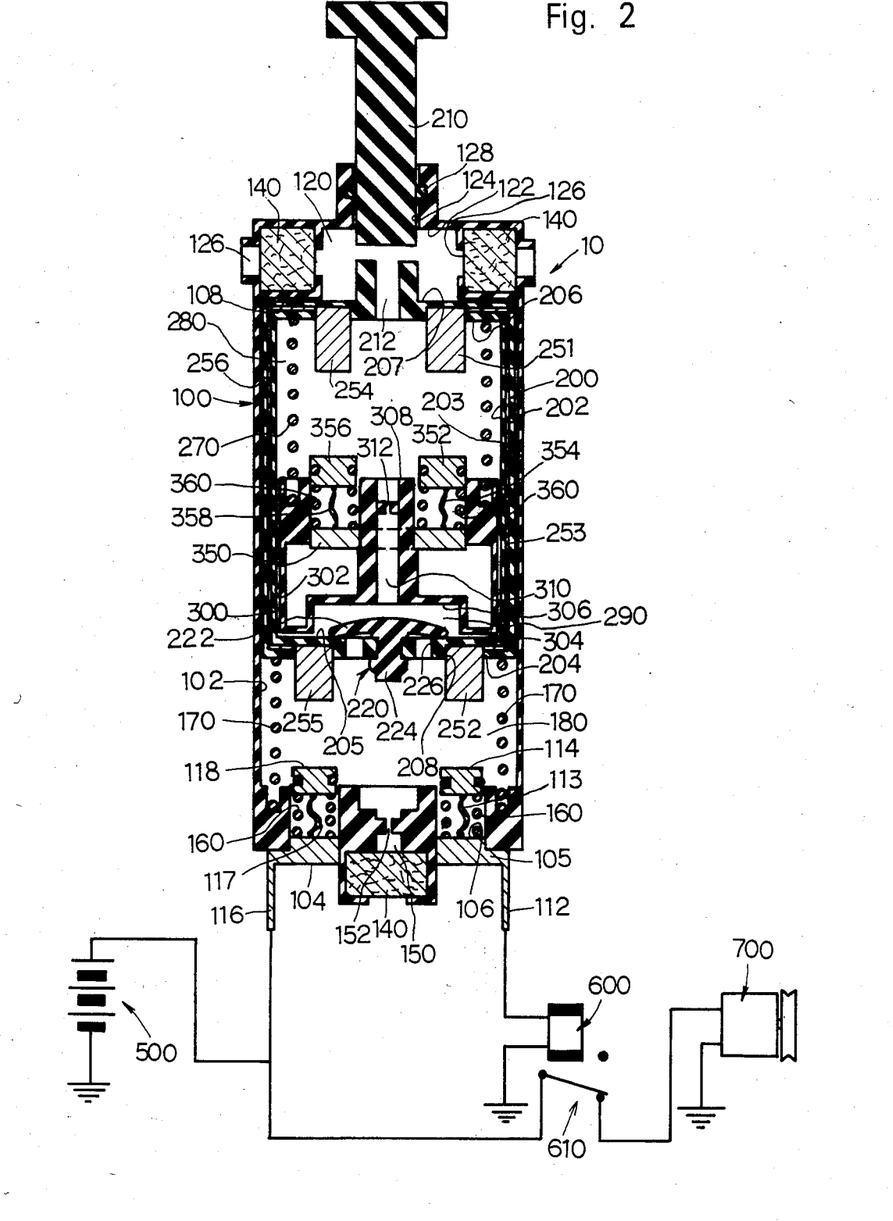
FIG. 2 is partial cross-sectional view of the apparatus in which the components are in a normal driving condition of the vehicle.

Referring to FIG. 1, a compressor 700 of an air conditioning control device is mounted on a vehicle floor, and a relay 600 is mounted on the compressor 700. The relay 600 normally closes a circuit 610, and supplies electricity from a battery 500 to the compressor 700, as shown in FIG. 2. The compressor 700 includes a driven pulley 701 and a clutch (not shown in drawings), and the driven pulley 701 of the compressor 700 is connected to an engine 800 by a belt 801. When the circuit 610 is closed so that electricity is supplied to the compressor 700, the clutch of the compressor 700 is coupled to a driven shaft 702 on which the driven pulley 701 is mounted. As a result, when the electricity is supplied to the compressor 700, an output from the engine 800 is transmitted to the compressor 700. Therefore, the compressor 700 is driven by the engine 800 and actuates an air conditioning control device so that cool air is supplied to a compartment of the vehicle.

Further, the relay 600 is connected to a control apparatus 10 for supplying the electricity to the relay 600 of the compressor 700 by a pair of connecting wires 601. The apparatus 10 includes a rod 210 connected to an accelerator pedal 900 by a link mechanism 950. Accordingly, when the accelerator pedal 900 is displaced by an operator in order to accelerate the vehicle, the rod 210 of the apparatus 10 is displaced within the apparatus 10.

As shown in FIG. 2, the apparatus 10 includes three enclosures, preferably an outer cylinder 100, an intermediate cylinder 200 and an inner cylinder 300. The inner cylinder 300 is slidably mounted on an inner cylindrical surface 202 of the intermediate cylinder 200. An outer diameter of the inner cylinder 300 is slightly shorter than an inner diameter of the intermediate cylinder 200, and grease adheres on the inner cylindrical surface 202 of the intermediate cylinder 200 and an outer cylindrical surface 302 of the inner cylinder 300. Accordingly, the inner cylinder 300 slides smoothly within the intermediate cylinder 200, but a seal is provided therebetween so that there is no air passage between the outer cylindrical surface 302 of the inner cylinder 300 and the inner cylindrical surface 202 of the intermediate cylinder 200.

The intermediate cylinder 200 is slidably mounted on an inner cylindrical surface 102 of the outer cylinder 100. An outer diameter of the intermediate cylinder 200 is slightly shorter than an inner diameter of the outer cylinder 100, and grease adheres on the inner cylindrical surface 102 of the outer cylinder 100 and an outer cylindrical surface 203 of the intermediate cylinder 200. Accordingly, the intermediate cylinder 200 slides smoothly within the outer cylinder 100, but a seal is provided therebetween so that there is no air passage between the outer cylindrical surface 203 of the intermediate cylinder 200.

The outer cylinder 100 includes a pair of terminals 112, 116 and a bottom air passage 150 on a bottom portion thereof. The terminals 112, 116 project from an outer bottom surface 104 of the outer cylinder 100. The terminal 112 is connected to a movable contact 114 by a flexible connecting wire 113, and the movable contact 114 is positioned within the outer cylinder 100 but separated from an inner bottom surface 106 of the outer cylinder 100 by a bottom coil spring 160. In like manner, the terminal 116 is connected to an another movable contact 118 by an another flexible connecting wire 117, and the movable contact 118 is positioned within the outer cylinder 100 but separated from the inner bottom surface 106 by an another bottom coil spring 160. The bottom air passage 150 is opened preferably at a central portion of a bottom plate 105, and an air filter 140 is positioned on a lower portion of the air passage 150. A bottom orifice 152 is defined on an upper portion of the air passage 150.

Further, a lower bias spring 170 is mounted on the inner bottom surface 106 of the outer cylinder 100, and the intermediate cylinder 200 is biased upwardly by the lower bias spring 170. Accordingly, a bottom chamber 180 is defined between the inner bottom surface 106 and the inner cylindrical surface 102 of the outer cylinder 100 and an outer bottom surface 204 of the intermediate cylinder 200.

The outer cylinder 100 includes a top hole 124, an upper wall 108, a plurality of upper air passages 126 and a top chamber 120. The top hole 124 is opened preferably at a central portion of an inner top surface 122, and the rod 210 of the apparatus 10 is inserted into the top hole 124. An O-ring 128 is positioned between the rod 210 and the top hole 124, so that the top chamber 120 cannot communicate with the outside of the outer cylinder 100 through the top hole 124. A plurality of upper air passages 126 are defined between the inner top surface 122 and the upper wall 108, and a plurality of air filters 140 are positioned on the corresponding plurality of the upper air passages 126. Accordingly, the top chamber 120 is defined among the inner top surface 122 of the outer cylinder 100, a plurality of the air filters 140 and an outer top surface 207 of the intermediate cylinder 200.

The rod 210 projects from a central portion of the outer top surface 207 of the intermediate cylinder 200, and a top air passage 212 is defined within the rod 210. An upper chamber 280 of the intermediate cylinder 200 communicates with the top chamber 120 of the outer cylinder 100 through the top air passage 212.

The intermediate cylinder 200 includes a check valve 220 and a pair of outer bottom contacts 252, 255 on a bottom portion thereof. The check valve 220 includes a lip 222 and a base 224 thereon. A plurality of air passages 226 are opened in an inner bottom plate 208. The base 224 of the check valve 220 is fixed at a central portion of the inner bottom plate 208, and the lip 222 covers a plurality of the air passages 226 and a part of the inner bottom surface 205 of the intermediate cylinder 200. Accordingly, the lip 222 of the check valve 220 normally prevents the bottom chamber 180 of the outer cylinder 100 from communicating with a lower chamber 290 of the intermediate cylinder 200. The pair of the outer bottom contacts 252, 255 project downwardly from the outer bottom surface 204 of the intermediate cylinder 200. A pair of inner top contacts 251, 254 project downwardly from the inner top surface 206 of the intermediate cylinder 200, and are respectively connected to the pair of the outer bottom contacts 252, 255 through a pair of connecting wires 253, 256.

Further, an upper bias spring 270 is positioned between the inner top surface 206 of the intermediate cylinder 200 and an outer top surface 308 of the inner cylinder 300, and the inner cylinder 300 is biased downwardly. The inner cylinder 300 tends to separate from the inner top surface 206 of the intermediate cylinder 200 by the upper bias spring 270, and the upper chamber 280 is defined among the inner top surface 206, the inner cylindrical surface 202 of the intermediate cylinder 200 and the outer top surface 308 of the inner cylinder 300.

The inner cylinder 300 includes a recess 306 on the outer bottom surface 304 thereof, and the lower chamber 290 is defined between the recess 306 of the inner cylinder 300 and the inner bottom surface 205 of the intermediate cylinder 200.

Further, the inner cylinder 300 includes an intermediate air passage 310 and a connector 350 thereon. An orifice 312 is defined within the intermediate air passage 310 of the inner cylinder 300. A pair of movable contacts 352, 356 are respectively positioned on the outer top surface 308 of the inner cylinder 300, and are respectively supported over the connector 350 by a pair of upper coil springs 360. A pair of flexible connecting wires 354, 358 connect respectively the movable contacts 352, 356 to the connector 350.

The operation of the control apparatus 10 for supplying the electricity to the relay 600 of the compressor 700 of the air conditioning control device is disclosed hereinafter.

FIG. 2 shows components of the apparatus 10 in a condition when the vehicle is normally driving. The intermediate cylinder 200 is biased upwardly by the lower bias spring 170, and the outer top surface 207 of the intermediate cylinder 200 abuts on the upper wall 108 of the outer cylinder 100. The inner cylinder 300 is biased downwardly by the upper bias spring 270, and the outer bottom surface 304 of the inner cylinder 300 abuts on the inner bottom surface 205 of the intermediate cylinder 200. Accordingly, electricity is not supplied to the relay 600 through the apparatus 10, because the pair of the inner top contacts 251, 254 of the intermediate cylinder 200 is not in contact with the pair of the movable contacts 352, 356, of the inner cylinder 300 and the pair of the outer bottom contacts 252, 255 of the intermediate cylinder is not in contact with the pair of the movable contacts 114, 118 of the outer cylinder 100. Therefore, the circuit 610 remains closed and electricity is supplied from the battery 500 to the compressor 700 through the relay 600 by bypassing the apparatus 10. The engine thus drives the compressor.

Figure 3:
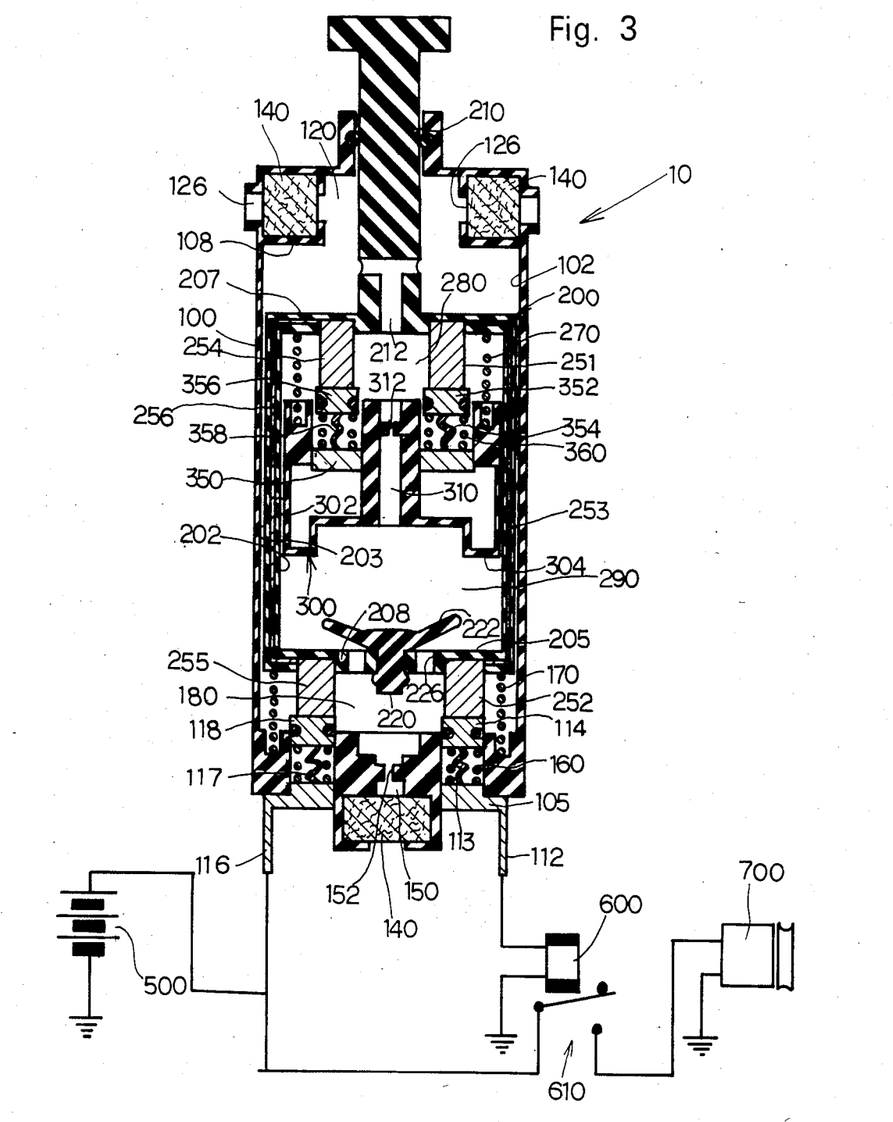
FIG. 3 is a partial cross-sectional view of the apparatus in which the components are in a condition that the vehicle is at an initiation of an acceleration.

When the accelerator pedal 900 is displaced in order to accelerate the vehicle, the rod 210 of the intermediate cylinder 200 is displaced within the outer cylinder 100 as shown in FIG. 3. The intermediate cylinder 200 is moved downwardly against the bias force of the lower bias spring 170, and the pair of the outer bottom contacts 252, 255 of the intermediate cylinder 200 are respectively in contact with the pair of movable contacts 114, 118 of the outer cylinder 100. When the bottom chamber 180 of the outer cylinder 100 becomes smaller, air flows from the bottom chamber 180 of the outer cylinder 100 to the lower chamber 290 of the intermediate cylinder 200 through a plurality of air passages 226. Because the bottom chamber 180 of the outer cylinder 100 has the bottom orifice 152 which regulates the amount of the air passing therethrough, the air flowing to the lower chamber 290 of the intermediate cylinder 200 pushes upwardly on the inner cylinder 300 against the bias force of the upper bias spring 270, and the lower chamber 290 of the intermediate cylinder 200 expands. The inner cylinder 300 has the intermediate orifice 312 within the intermediate air passage 310 to regulate the amount of the air passing therethrough. The air flow is preferably regulated by providing constrictions in the bottom surface 152 and intermediate air passage 310.

Accordingly, the pair of the movable contacts 352, 356 are respectively in contact with the pair of the inner top contacts 251, 254. Therefore, electricity is supplied from the battery 500 to the relay 600 through the apparatus 10, and the relay 600 opens the circuit 610. As a result, electricity cannot be supplied from the battery 500 to the compressor 700 through the relay 600, and almost all of the output from the engine 800 can be used in order to drive the vehicle.

Figure 4:
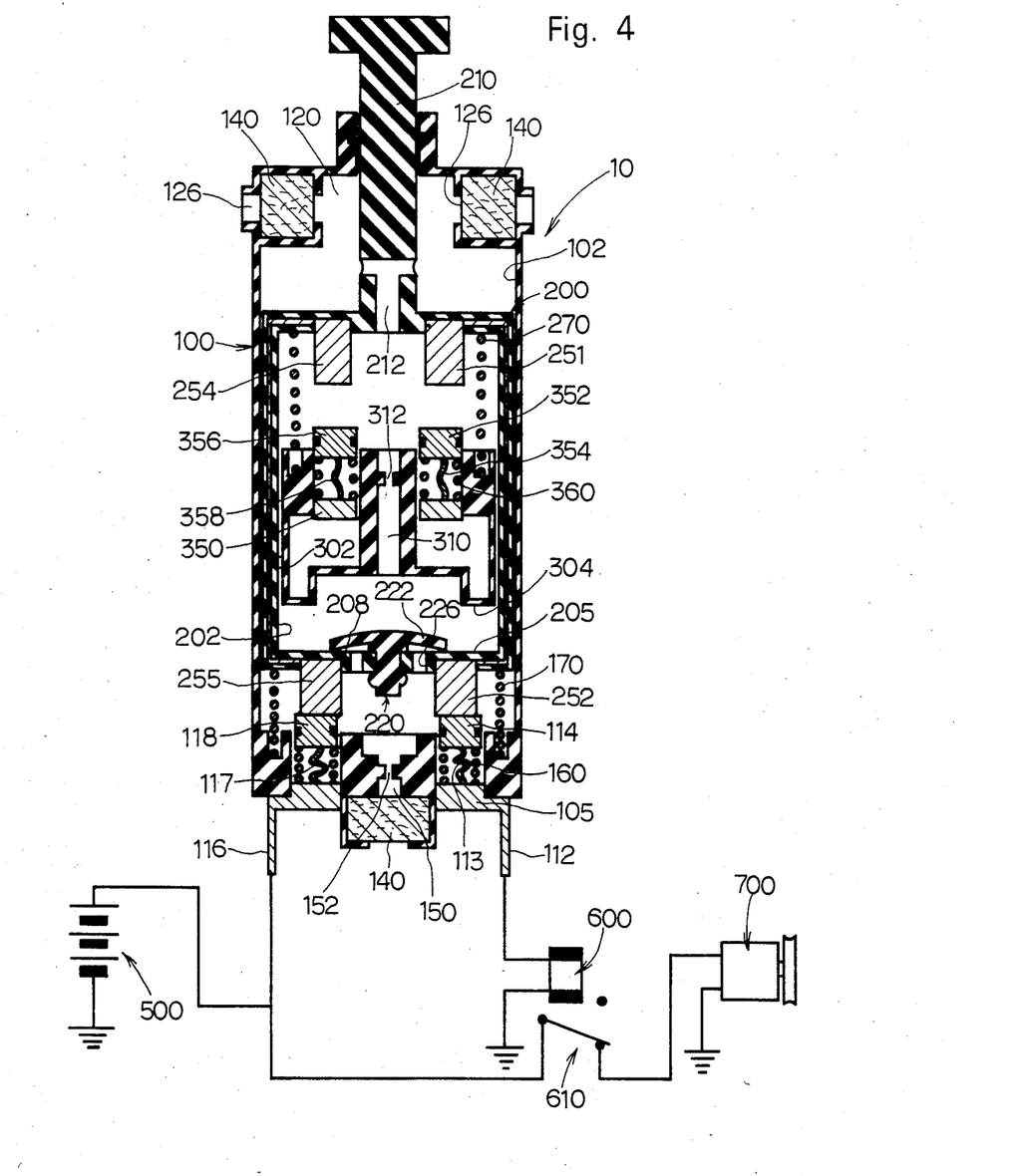
FIG. 4 is a partial cross-sectional view of the apparatus in which the components are in a condition that the vehicle is accelerating for more than a predetermined time period.

As shown in FIG. 4, the inner cylinder 300 is gradually pushed down by the bias force of the upper bias spring 270 after the condition shown in FIG. 3. Electricity is still supplied to the relay and thus not supplied to the compressor for a predetermined time period after initiation of acceleration which time period extends until the pair of movable contacts 352, 356 gradually separates from the pair of the inner top contacts 251, 254 after a predetermined time period. The predetermined time period depends on a size of the intermediate orifice 312 of the inner cylinder 300. That is, air from the lower chamber 290 flows to the upper chamber 280 through the intermediate orifice 312, thereby permitting the inner cylinder 300 to move down to disconnect the movable contacts 352, 356 from the top contacts 251, 254. The rate of downward movement of the inner cylinder 300 depends on the size of the constriction in the intermediate orifice 312.

Upon disconnection of the movable contacts 352, 356 from the top contacts 251, 254, electricity is not supplied from the battery 500 to the relay 600 through the apparatus 10, so that the circuit 610 closes. Electricity is then supplied from the battery 500 to the compressor 700 through the relay 600, after the predetermined time period has passed, even if the rod 210 of the intermediate cylinder 200 is still pushing down on the intermediate cylinder 200.

Figure 5:
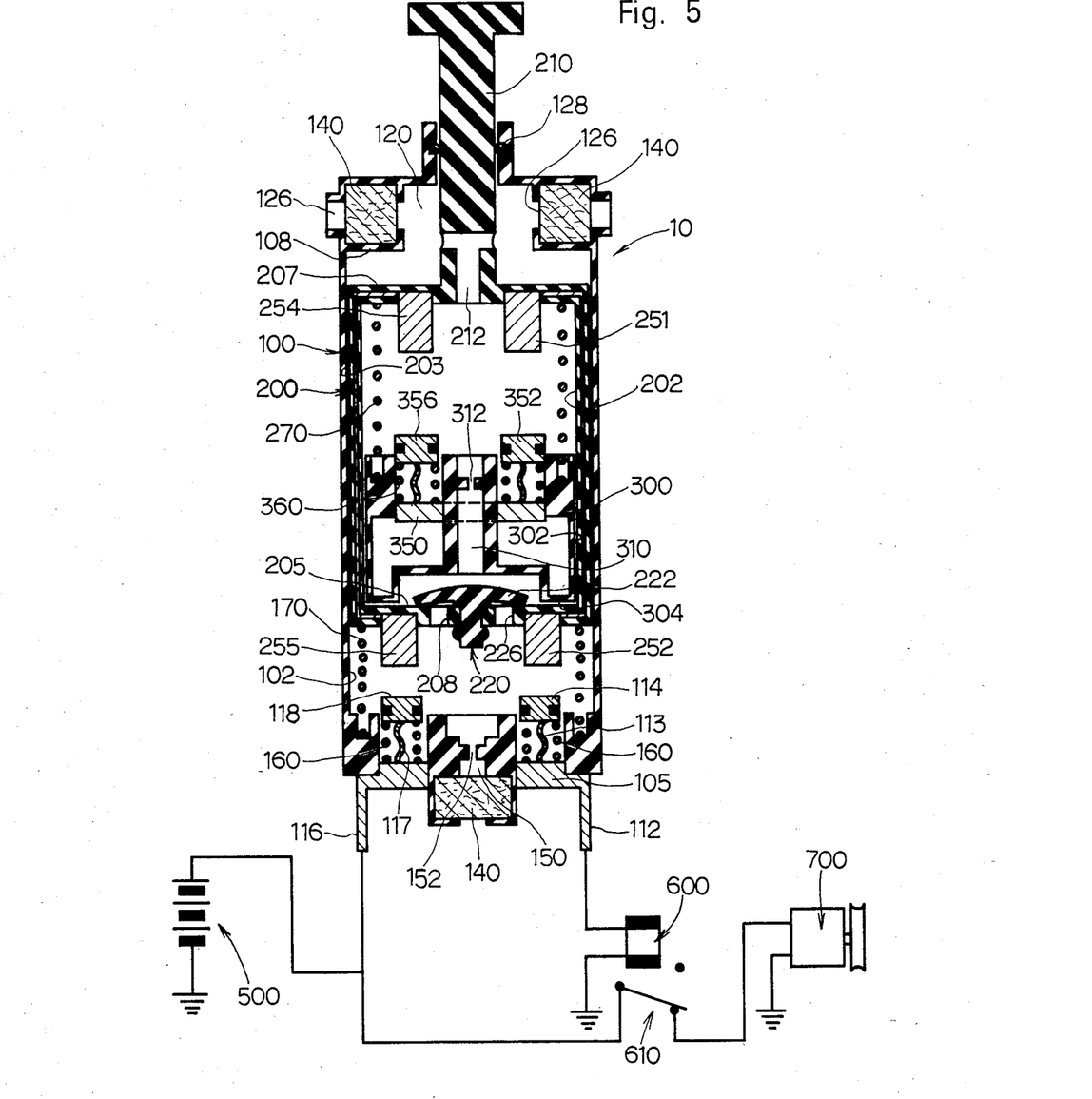
FIG. 5 is a partial cross-sectional view of the apparatus in which the components are in a condition that the acceleration of the vehicle is completed.

When the acceleration of the vehicle is terminated, the force pushing the rod 210 of the intermediate cylinder 200 is removed from the rod 210. The rod 210 of the intermediate cylinder 200 gradually pushes up by the bias force of the lower bias spring 170, as shown in FIG. 5.

Figure 6:
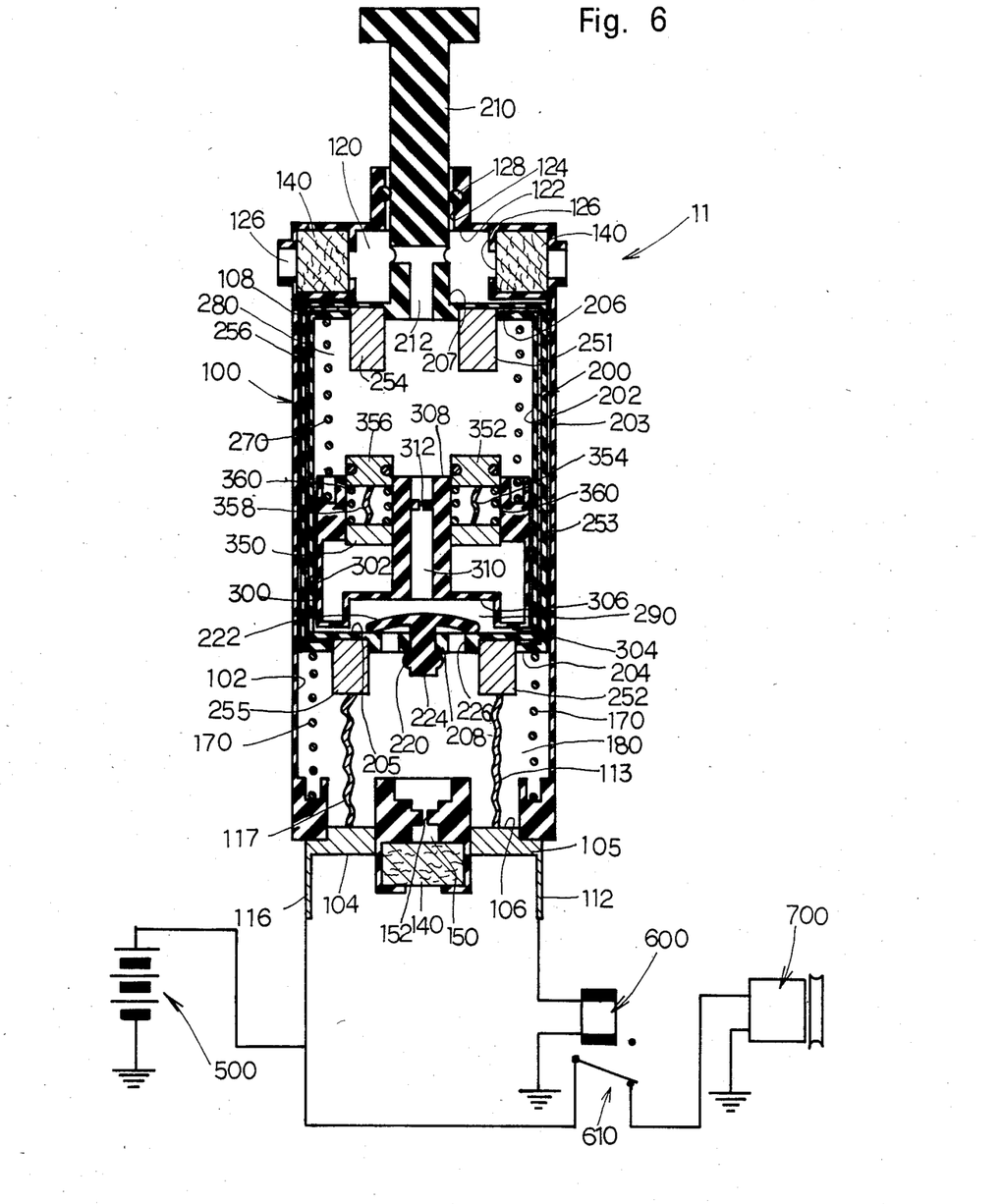
FIG. 6 is a partial cross-sectional view of an apparatus of a second embodiment according to the present invention, the components of which are in a normal driving condition.

A second embodiment of an apparatus for supplying electricity to a relay of a compressor of an air conditioning control device is shown in FIG. 6.

The second embodiment is substantially similar to the first embodiment disclosed in FIG. 2. However, the major difference between the apparatus 11 shown in FIG. 6 and the apparatus 10 shown in FIG. 2 is that a pair of outer bottom contacts 252, 255 of an intermediate cylinder 200 are respectively connected to a pair of terminals 112, 116 of an outer cylinder 100 through a pair of flexible connecting wires 113, 117.

Variations of the invention disclosed herein are possible without departing from the scope of the claims. For example, it is apparent to an artisan of ordinary skill in the art that a rod 210 of an intermediate cylinder 200 can be displaced by the movement of a throttle valve of an engine 800 through a link mechanism. Other variations are possible.

As described herein, the present invention overcomes the shortcomings of the known art by providing an compact apparatus which supplies electricity to a relay of a compressor of an air conditioning control device.

While the present invention has been described in its preferred embodiments, it is to be understood that the invention is not limited thereto, and may be otherwise embodied within the scope of the following claims.

What is claimed is:

1. A control apparatus for selectively supplying electricity from an electric source to a relay of a compressor of an air conditioning control device, said control apparatus opening a circuit to interrupt the supply of the electricity to the compressor at an initiation of acceleration of a vehicle engine and maintaining the interruption until a predetermined time period has elapsed from the initiation of the acceleration, the control device comprising:
   a first enclosure having first and second terminals on one end thereof, the first terminal connected to the relay of the compressor, the second terminal connected to the electric source;
   a second enclosure slidably received within the first enclosure, the second enclosure having first and second contacts on one end thereof and third and fourth contacts on an opposite end thereof, the first contact electrically connected to the third contact and the second contact electrically connected to the fourth contact, the third and fourth contacts facing the first and second terminals, respectively;
   a third enclosure slidably received within the second enclosure and having a connector facing the first and second contacts of the second enclosure;
   first biasing means for urging the third and fourth contacts of the second enclosure away from the first and second terminals of the first enclosure and second biasing means for urging the first and second contacts of the second enclosure away from the connector of the third enclosure;
   means for moving said second and third enclosures against said biasing means in response to an initiation of acceleration of the vehicle engine to place the third and fourth contacts in contact with the first and second terminals, respectively, and place the first and second contacts in contact with the connector so that electricity is supplied to the relay to open the circuit and prevent the supply of electricity to the compressor; and
   means for separating the first and second contacts from the connector after a predetermined time period has elapsed from the initiation of acceleration, said first and second contacts separating from the connector to prevent the supply of electricity to the relay and close the circuit to permit the supply of electricity to the compressor.

2. The control apparatus of claim 1, wherein said first, second and third enclosures are cylindrical enclosures, the third cylindrical enclosure being slidably disposed within the second cylindrical enclosure which is slidably disposed with the first cylindrical enclosure.

3. The control apparatus of claim 1, wherein the first enclosure has first and second ends, said means for moving the second the third enclosures extending through the first end of the first enclosure opposite from the first and second terminals on the second end of first enclosure.

4. The control apparatus of claim 3, wherein said means for moving said second and third enclosures includes a rod extending through said first enclosure.

5. The control apparatus of claim 4, wherein said rod is connected through a linkage to an accelerator pedal of the vehicle.

6. The control apparatus of claim 4, wherein said means for moving said second and third enclosures further includes:
   a first air chamber defined in said first enclosure between said first and second terminals and said third and fourth contacts, said first biasing means being located within said first chamber, said first chamber communicating with an environment exterior of said first enclosure through a first air passage;
   a second air chamber defined between a first end of said second enclosure and said connector of said third enclosure, said second biasing means located in a portion of said second air chamber, said second chamber communicating with said external environment through a conduit;
   a third chamber located between said first and second chambers, said third chamber communicating with said second chamber through a second air passage, said first chamber communicating with said third chamber through a check valve;
   said rod being driven upon initiation of said acceleration into said first enclosure to move said third and fourth contacts toward said first and second terminals and force air from said first chamber through said check valve into said third chamber to move said connector toward said first and second contacts.

7. The control apparatus of claim 6, wherein said means for separating said first and second contacts from said connector after a predetermined period includes:
   first air regulating means located within said first air passage for regulating flow of air passing from said first chamber to said exterior environment; and
   second air regulating means located within said second air passage for regulating the flow of air passing from said third chamber to said second chamber, said second air regulating means limiting the flow of air into said second chamber to maintain said first and second contacts in contact with said connector for said predetermined time period after initiation of acceleration.

8. The control apparatus of claim 7, wherein said first and second regulating means are contrictions in said first and second air passages.

9. The control apparatus of claim 6, wherein said first air passage and said conduit are provided with filters.

10. The control apparatus of claim 1, wherein seals are provided between said first and second enclosures and between said second and third enclosures.

11. The control apparatus of claim 1, further comprising a first electrical connection between said first terminal of said first enclosure and said third contact of said second enclosure, and a second electrical connection between said second terminal of said first enclosure and said fourth contact of said second cylinder.

12. A control apparatus for supplying electricity from an electric source to a relay of a compressor of an air conditioning control device in which electricity is supplied to the relay to open a circuit so that electricity is not supplied to the compressor at an initiation of an acceleration of a vehicle, and in which electricity is not supplied to the relay to close the circuit so that electricity is supplied to the compressor after a predetermined time period has passed from the initiation of the acceleration of the vehicle, the control apparatus comprising:
a first cylinder having a first top plate and a first bottom plate, the first top plate having a first hole, the first bottom plate having a first terminal, a second terminal and a first regulating means for regulating the amount of air therethrough, the first terminal connected to the relay of the compressor, the second terminal connected to the electric source;
a second cylinder slidably mounted within said first cylinder, said second cylinder having a second top plate and a second bottom plate, the second top plate having a rod, an air passage, a first contact and a second contact, the second bottom plate having a one way valve, a third contact and a fourth contact, the rod projecting from the second top plate and slidably extending through the first hole of said first cylinder, the first contact connected to the third contact, the second contact connected to the fourth contact, the third and the fourth contacts facing respectively the first and the second terminals of said first cylinder, the one way valve accepting an air flow from an outside into an inside of said second cylinder;
a first chamber defined between the first bottom plate of said first cylinder and the second bottom plate of said second cylinder;
a first bias means mounted within said first chamber between the first bottom plate of said first cylinder and the second bottom plate of said second cylinder, said first bias means biasing the second bottom plate in a direction separating the second bottom plate from the first bottom plate of said first cylinder;
a third cylinder slidably mounted within said second cylinder, said third cylinder having a third top plate, a third bottom plate and a second regulating means for regulating the amount of air therethrough, the third top plate having a connector facing the first and the second contacts of said second cylinder;
a second chamber defined between the first top plate of said first cylinder and the third top plate of said third cylinder, said second chamber communicating with an outside of said second cylinder through the air passage of said second cylinder;
a second bias means mounted between the second top plate of said second cylinder and the third top plate of said third cylinder, said second bias means biasing the third top plate in a direction separating the third top plate from the second top plate; and
a third chamber defined between the second bottom plate of said second cylinder and the third bottom plate of said third cylinder, said third chamber communicating with said second chamber through the second regulating means of said third cylinder,
the rod being displaced into the first cylinder to move said second and third cylinders in response to an initiation of acceleration of the vehicles so that the first and the second contacts of said second cylinder are in contact with the connector of said third cylinder, and the third and the fourth contacts of said second cylinder are in contact with the first and the second terminals of said first cylinder, respectively, to supply electricity to said relay to open the circuit and prevent the supply of electricity to the compressor, said first and second regulating means permitting separation after said predetermined time period of said first and second contacts from said connector, and said third and fourth contacts from said first and second terminals.

13. The control apparatus of claim 12, wherein said first cylinder has a first air passage on an upper portion thereof which is defined between the first top plate of said first cylinder and the second top plate of said second cylinder.

14. The control apparatus of claim 13 further comprising a filter positioned within the first air passage of said first cylinder.

15. The control apparatus of claim 12, wherein the first bottom plate of said first cylinder has a second air passage within which the first regulating means of said first cylinder is defined.

16. The control apparatus of claim 15 further comprising a filter positioned within the second air passage of said first cylinder.

17. The control apparatus of claim 12 further comprising a first electrical connection between said first terminal of said first cylinder and said third contact of said second cylinder, and a second electrical connection between said second terminal of said first cylinder and said fourth contact of said second cylinder.

* * * * *